United States Patent Office 3,290,302
Patented Dec. 6, 1966

3,290,302
PROCESS FOR THE PREPARATION OF BENZO-THIADIAZINE-DIOXIDES
Fernand G. F. Eloy, Rhode-Saint-Genese, Belgium, assignor to Union Carbide Corporation, a corporation of New York
No Drawing. Filed Aug. 4, 1964, Ser. No. 387,523
10 Claims. (Cl. 260—243)

This invention relates to a novel process for the preparation of heterocyclic nitrogen and sulfur containing compounds. In one aspect, this invention relates to a novel process for the preparation of benzothiadiazine-dioxides. In a further aspect, this invention relates to a novel process for the preparation of 3-substituted 1,2,4-benzothiadiazine - 1,1 - dioxides, a class of highly active anti-hypertensive and diuretic agents.

Due to the outstanding and desirable physiological characteristics of the benzothiadiazine-dioxides, these compositions are currently of interest as pharmaceutical chemicals. For example, the 1,2,4-benzothiadiazine-1,1-dioxides constitute a well known class of the diuretics and hypotensive agents. Although these compositions have been known since 1938, the work of F.C. Novello and J. M. Sprague, J. Am. Chem. Soc. 79, 2028 (1957) revealed that they possessed outstanding biological properties which made them particularly attractive as highly active diuretic and saluretic drugs.

These desirable features have stimulated a search for a commercially feasible synthetic route for the preparation of benzothiadiazine-dioxides and derivatives thereof from inexpensive and readily available raw materials.

Heretofore, among the known syntheses previously disclosed in the literature for the preparation of benzo-thiadiazine-dioxides was the work of J. G. Topliss et al., Journal of Medicinal Chemistry, 6, 122 (1963). A typical example of this method involves a multistep process for the preparation of 3-ethyl-7-chloro-1,2,4-benzothia-diazine - 1,1 - dioxide. In essence, the synthesis commenced with the reaction of 2,4-dichloronitrobenzene with phenylmethylthiol and proceeded through six steps to the 1,2,4-benzothiadiazine-1,1-dioxide as indicated below:

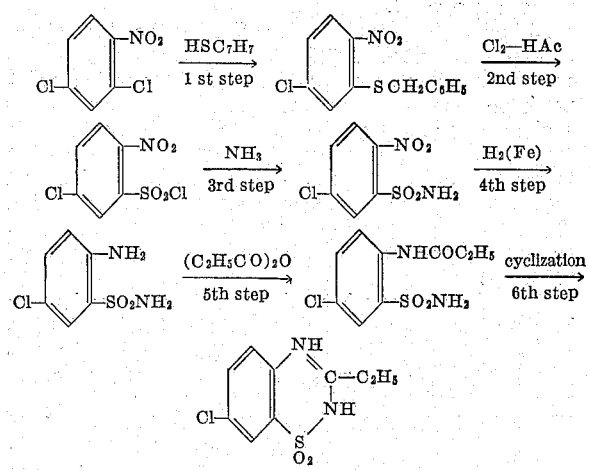

However, inasmuch as the process requires at least six steps and provides an overall yield of the desired product of about ten percent, it would undoubtedly be very costly and unsuitable for large scale production. In contrast to the aforementioned six step process disclosed in the literature, the novel process of this invention provides yields at least twice those previously obtained.

Accordingly, one or more of the following objects will be achieved by the practice of the instant invention.

It is an object of the present invention to provide a simple and practical procedure for the preparation of benzothiadiazine dioxides wherein the disadvantages hereinbefore enumerated are substantially eliminated. A further object of the present invention is to provide a process for the preparation of benzothiadiazine-dioxides which is practical, economical, and affords reasonable yields. Another object is to provide a novel process which employs readily available and inexpensive raw materials. A further object is to provide a process for the preparation of benzothiadiazine-dioxides from 1,2,3,5-oxathia-diazole-2-oxides. Another object is to provide a process for the preparation of benzothiadiazine-dioxides which involves the thermal rearrangement of 1,2,3,5-oxathia-diazole-2-oxides. These and other objects will readily become apparent to those skilled in the art in the light of the teachings herein set forth.

In its broad aspect, this invention is directed to a novel process for the preparation of benzothiadiazine-dioxides which comprises the thermal rearrangement in an inert solvent of 1,2,3,5-oxathiadiazole-2-oxides. This process provides a novel route to the 1,2,4-benzothiadia-zine-1,1-dioxides in relatively high yields compared to methods heretofore known. The novel process of the present invention can be conveniently illustrated by the following equation:

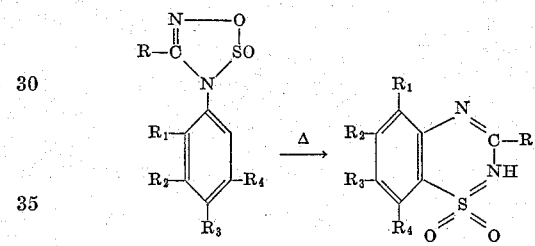

Wherein R represents a monovalent aliphatic alicyclic or heterocyclic organic group attached to the ring carbon atom through a carbon to carbon bond, and $R_1$–$R_4$ reprecents hydrogen, halogen, i.e., chloro, bromo, iodo, sulf-amyl, nitro, or a monovalent aliphatic, alicyclic or heterocyclic organic group. Additionally, $R_1$ and $R_2$ or $R_2$ and $R_3$ when taken together, can form a six-membered aromatic ring with the carbon atoms to which they are attached. Preferred compositions which can be prepared by the process of this invention include those of the aforementioned formula wherein R represents an aliphatic, alicyclic, or aromatic group containing up to 12 carbon atoms, and $R_1$–$R_4$ represent hydrogen, halogen, sulfamyl, nitro or an aliphatic group containing up to 12 carbon atoms. Also preferred are those compositions wherein R represents a hydrocarbon, nitrohydrocarbon, or halo-hydrocarbon group containing from 1 to 12 carbon atoms, and $R_1$–$R_4$ represent halogen, hydrocarbon, halohydro-carbon, hydrocarbyloxy, or carbohydrocarbyloxy groups containing from 1 to 12 carbon atoms. Particularly preferred compositions which can be prepared by the process of the instant invention include those wherein R represents alkyl, alkenyl, cycloalkyl, cycloalkenyl, cycloalkyl-alkyl, aryl, aralkyl, haloalkyl, nitroaryl, aralkylthioalkyl, and the like, and $R_1$–$R_4$ represent halogen, nitro, amino, aminoalkyl, alkylamino, alkyl, haloalkyl, alkoxy, carbo-alkoxy, cycloalkyl, cycloalkenyl, cycloalkylalkyl, aryl, aralkyl, and the like.

Illustrative oxathiadiazole-oxides which can be employed in the process of the present invention include, among others, such compounds as:

3-phenyl-4-methyl-1,2,3,5-oxathiadiazole-2-oxide,
3-phenyl-4-ethyl-1,2,3,5-oxathiadiazole-2-oxide,
3-phenyl-4-propyl-1,2,3,5-oxathiadiazole-2-oxide, 3-phenyl-4-butyl-1,2,3,5-oxathiadiazole-2-oxide,
3-phenyl-4-nonyl-1,2,3,5-oxathiadiazole-2-oxide,
3-phenyl-4-dodecyl-1,2,3,5-oxathiadiazole-2-oxide,
3-phenyl-4-cyclopentyl-1,2,3,5-oxathiadiazole-2-oxide,
3,4-diphenyl-1,2,3,5-oxathiadiazole-2-oxide,
3-(para-chlorophenyl)-4-ethyl-1,2,3,5-oxathiadiazole-2-oxide,
3-tolyl-4-ethyl-1,2,3,5-oxathiadiazole-2-oxide,
3-(para-methoxyphenyl)-4-ethyl-1,2,3,5-oxathiadiazole-2-oxide,
3-phenyl-4-(para-nitrophenyl)-1,2,3,5-oxathiadiazole-2-oxide,
3-para-tolyl-4-(para-nitrophenyl)-1,2,3,5-oxathiadiazole-2-oxide,
3-(para-carbomethoxyphenyl)-4-ethyl-1,2,3,5-oxathiadiazole-2-oxide,
3-alpha-naphthyl-4-ethyl-1,2,3,5-oxathiadiazole-2-oxide,
and the like.

Upon thermal rearrangement the aforementioned compositions gives the following respective benzothiadiazine-dioxides:

3-methyl-1,2,4-benzothiadiazine-1,1-dioxide,
3-ethyl-1,2,4-benzothiadiazine-1,1-dioxide,
3-propyl-1,2,4-benzothiadiazine-1,1-dioxide,
3-butyl-1,2,4-benzothiadiazine-1,1-dioxide,
3-nonyl-1,2,4-benzothiadiazine-1,1-dioxide,
3-dodecyl-1,2,4-benzothiadiazine-1,1-dioxide,
3-cyclopentyl-1,2,4-benzothiadiazine-1,1-dioxide,
3-phenyl-1,2,4-benzothiadiazine-1,1-dioxide,
3-ethyl-7-chloro-1,2,4-benzothiadiazine-1,1-dioxide,
3-ethyl-7-methyl-1,2,4-benzothiadiazine-1,1-dioxide,
3-ethyl-7-methoxy-1,2,4-benzothiadiazine-1,1-dioxide,
3-nitrophenyl-1,2,4-benzothiadiazine-1,1-dioxide,
3-nitrophenyl-7-methyl-1,2,4-benzothiadiazine-1,1-dioxide,
3-ethyl-7-carbomethoxy-1,2,4-benzothiadiazine-1,1-dioxide,
3-ethyl-1,2,4-alpha, beta-naphthothiazine-1,1-dioxide, and the like.

As hereinbefore indicated the conversion of the oxathiadiazole-oxides to the benzothiadiazine-dioxides is effected by a thermal rearrangement preferably in an inert solvent. Although the temperature employed will largely be dependent upon the particular oxathiadiazole-oxide employed, in general, a temperature range of from 50° to about 250° C., and more preferably from about 100° to about 175° C., have been found to be satisfactory. Temperatures above and below the aforesaid ranges can also be employed but are less preferred.

The use of an inert solvent for the thermal rearrangement is preferred though not absolutely necessary. In some instances, particularly, if the starting oxathiadiazole-oxide is a liquid, it may be possible to promote the rearrangement in the absence of a solvent. However, for most practical purposes the use of a solvent is preferred. In general, the choice of the solvent will largely be dependent upon its inability to undergo reactions with either the starting material or benzothiadiazine-2-dioxide product; its ease of separation from the reaction product; as well as economic considerations. Due to the fact that the presence of water interfers with the reaction, the solvents which are employed are preferably inert, anhydrous, normally liquid organic solvents.

A variety of inert, anhydrous, organic solvents can optionally be employed in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. Typical solvents which can be employed include toluene, xylene, dioxane, diisopropyl ether, dibutyl ether, 1,2-diethoxyethane, tertiary butanol, secondary butanol, 2-propanol, tertiary amyl alcohol, methyl isobutyl carbinol, and the like.

The amount of solvent present can vary within wide limits, and while amounts up to about ten percent by volume of the total charge of oxathiadiazole-oxide are usually preferred, amounts in excess of this can be employed. Thus, this limit is one rather, of economic practicability. It is noted that the amount of diluent employed will also vary with the particular compound used and the manner in which the process is conducted. Preferred solvents are those completely miscible with the reactant and product and which can be readily separated. Pressure is not necessarily critical and the process can be conducted at atmospheric, subatmospheric or superatmospheric pressures. Additionally, if desired, the process can be conducted in an inert atmosphere, such as nitrogen, argon, and the like.

The contact time necessary to effect the novel process of the present invention need only be of such duration as to insure optimum conversion of the oxathiadazole-2-oxide to the corresponding benzothiadiazine-dioxide. Reaction times of from one hour to several hours are thoroughly practicable. Shorter or longer periods can also be feasibly employed depending upon the temperature (higher temperatures usually permit the use of shorter reaction times), and the manner in which the process is conducted (i.e., batchwise or continuous process). Generally, after the desired temperature has been reached the reaction is essentially complete after from about 1 to about 24 hours, and more preferably from about 1 to about 12 hours.

The process of the present invention is applicable to both batch and continuous type operations. For instance, the reaction can be conducted batchwise or in a continuous manner by means of a tubular or tank reactor. When operating a continuous process the 1,2,3,5-oxathiadiazole-2-oxide compound can be gradually added to the reactor simultaneously with the solvent or the solvent can be separately preheated and brought to the proper temperature prior to the addition of the oxide. Moreover, if a catalyst is employed, it can be added gradually to the reaction system at a plurality of points along the reaction zone or added to the solvent prior to heating.

If desired, although not necessary, a Lewis acid catalyst, such as aluminum trichloride, can be employed in the process of the instant invention. When employed, the catalyst is used in amounts varying from about 0.01 to about 5.0 weight percent of the oxathiadiazole compound and more preferably from about 0.02 to about 0.5 weight percent.

Although the technique for effecting the thermal rearrangement of the 1,2,3,5-oxathiadiazole-2-oxides is not necessarily critical, the optimum yield of the desired product is obtained by the gradual addition of the oxathiadiazole compound to a mixture of diluent and catalyst, if employed, the mixture being maintained at the desired temperature. This method is in preference to mixing all the components of the reaction and thereafter raising the temperature. In either case, the reactant will undergo thermal rearrangement but with varying degrees of efficiency.

The starting materials of the present invention, as hereinbefore indicated, are the corresponding 1,2,3,5-oxathiadiazole-2-oxides which can conveniently be prepared by one or more synthetic routes. For instance, the recent work of E. E. Schmitt as disclosed in U.S. Patent 3,118,903, indicates that 1,2,3,5-oxathiadiazole-2-oxides, can be prepared by the dipolar addition of a nitrile oxide to a sulfinylamine in accordance with the equation:

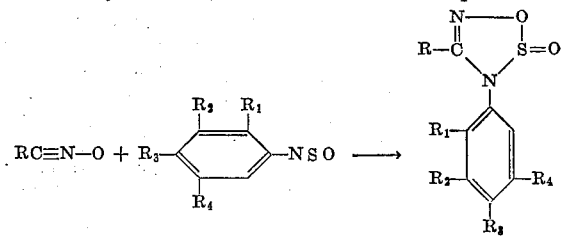

wherein R–R₄ have the same values as previously indicated. The sulfinylamines are themselves prepared by treatment of the amine with thionyl chloride. As a general rule, nitrile oxides are too unstable to be isolated since they dimerize to furoxanes. Hence, the nitrile oxides are usually formed in the solution containing the sulfinylamine by treating a hydroxamic acid chloride with a tertiary amine base. In the preparation of oxathiadiazole-oxides containing an aliphatic substituent, the aliphatic nitrile oxides are formed in situ by dehydrating a primary nitroalkane with an isocyanate.

If desired, after the benzothiadiazine-oxides have been prepared by the process of this invention, other functional groups can be introduced into the molecule. For example, a sulfamido group can be introduced in the molecule at the 7-position as the final step of the synthesis. Moreover, the benzothiadiazine-oxides can be hydrogenated to the 3,4-dihydro derivatives, many of which also are active compounds. Such compounds are characterized by their diuretic properties. A further important characteristic of the benzothiadiazine-oxide diuretics is their property of moderately reducing the blood pressure of hypertensive subjects. Moreover, it has been recently demonstrated that the removal of the sulfamido group from a compound having diuretic properties usually results in compounds without diuretic effect but which exhibit an increased antihypertensive activity. Hence, the novel process of this invention provides a simple and efficient route to these compositions.

In contrast to the aforementioned six step process, the thermal rearrangement of the oxathiadiazole-2-oxides provides a convenient three step process for the preparation of the same compositions. For example, starting with para-chloroaniline, a relatively inexpensive starting material compare to 2,4-dichloronitrobenzene, the 7-chloro-1,2,4-benzothiadiazine-1,1-dioxide can be prepared in accordance with the following steps:

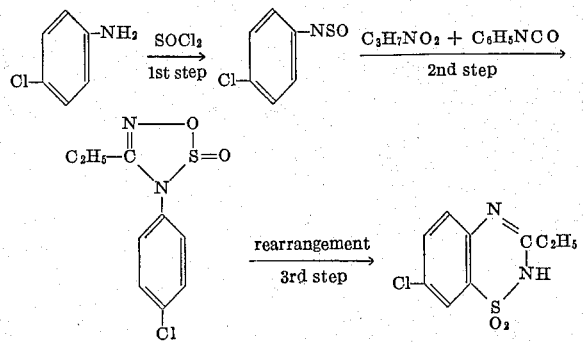

As previously indicated, the aforementioned route provides yields of the desired product of from 20–25 percent, in contrast to the approximately 10 percent of the six-step procedure.

The following examples are illustrative:

*Example 1.—3-ethyl-1,2,4-benzothiadiazine-1,1-dioxide*

A solution containing 5 grams of 3-phenyl-4-ethyl-1,2,3,5-oxathiadiazole-2-oxide dissolved in 100 cubic centimeters of dry toluene was heated to boiling for a period of twelve hours. At the end of this period the toluene solvent was removed by distillation under vacuum and the residue, consisting of crude 3-ethyl-1,2,4-benzothiadiazine-1,1-dioxide, crystallized from aqueous methanol. There was obtained 1.75 grams of the product which represented a 35 percent yield and which had a melting point of 210–211° C. Upon analysis the product was found to have the following composition.

Calculated for $C_9H_{10}N_2SO_2$: C, 51.50; H, 4.76; N, 13.33; S, 15.23. Found: C, 51.20; H, 4.88; N, 12.97; S, 15.06.

*Example 2.—3-ethyl-7-methoxy-1,2,4-benzothiadiazine-1,1-dioxide*

A solution containing 5 grams of 3-(para-methoxyphenyl)-4-ethyl-1,2,3,5-oxathiadiazole-2-oxide, dissolved in 100 cubic centimeters of dry toluene, was heated to boiling for a period of twelve hours. At the end of this period the toluene solvent was removed by distillation under vacuum and the residue consisting of crude 3-ethyl-7-methoxy-1,2,4-benzothiadiazine-1, 1-dioxide crystallized from benzene. There was obtained a yield of approximately 40 percent of the product which had a melting point of 199–200° C. Upon analysis the product was found to have the following composition.

Calculated for $C_{10}H_{12}N_2SO_3$: C, 50.00; H, 5.00; N, 11.65; S, 13.35. Found: C, 50.07; H, 4.80; N, 1.77; S, 13.06.

*Example 3.—3-ethyl-7-chloro-1,2,4-benzothiadiazine-1,1-dioxide*

A solution containing 5 grams of 3 - (para-chlorophenyl)-4-ethyl-1,2,3,5-oxathiadiazole-2 - oxide dissolved in 100 cubic centimeters of dry toluene was heated to boiling for a period of twelve hours. At the end of this period the toluene solvent was removed by distillation under vacuum and the residue consisting of crude 3-ethyl-7-chloro-1,2,4-benzothiadiazine-1,1 - dioxide, crystallized from methanol. There was obtained a yield of 45 percent of the product which had a melting point of 266–267° C. Upon analysis the product had the following composition.

Calculated for $C_9H_9ClN_2SO_2$: C, 44.30; H, 3.46; N, 11.49; Cl, 14.5; S, 13.10. Found: C, 44.20; H, 3.46; N, 11.71; Cl, 14.93; S, 13.53.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for the preparation of 1,2,4-benzothiadiazine-1,1-dioxides of the formula:

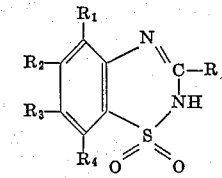

which comprises heating a 4-substituted 3-phenyl-1,2,3,5-oxathiadiazole-2-oxide of the formula:

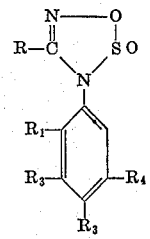

wherein R represents a member selected from the group consisting of hydrocarbon, nitrohydrocarbon, and halohydrocarbon groups of from 1 to 12 carbon atoms; $R_1$–$R_4$ represent a member selected from the group consisting of hydrogen, halogen, sulfamyl, nitro, and hydrocarbon, halohydrocarbon, hydrocarbyloxy, and hydrocarbyloxycarbonyl groups of from 1 to 12 carbon atoms, with the proviso that two adjacent $R_1$–$R_4$ groups when taken together can form a six membered aromatic ring with the carbon atoms to which they are attached; to a temperature of from about 50° C. to about 250° C. to cause thermal rearrangement of said 3-phenyl-1,2,3,5-oxathiadiazole-2-oxide to the 1,2,4-benzothiadiazine-1,1-dioxide.

2. The process of claim 1 wherein said 3-phenyl-1,2,3,5-oxathiadiazole-2-oxide is heated in an inert, anhydrous, organic solvent.

3. A process for the preparation of 3-hydrocarbyl-1,2,4-benzothiadiazine-1,1-dioxide which comprises heating 3-phenyl-4-hydrocarbyl-1,2,3,5-oxathiadiazole-2-oxide in an inert anhydrous, organic solvent to a temperature of from about 50° to about 250° C., and thereafter recovering said 3-hydrocarbyl-1,2,4-benzothiadiazine-1,1-dioxide.

4. A process for the preparation of 3-alkyl-1,2,4-benzothiadiazine-1,1-dioxide which comprises heating 3-phenyl-4-alkyl-1,2,3,5-oxathiadiazole-2-oxide in an inert, anhydrous, organic solvent to a temperature of from about 50° to about 250° C., and thereafter recovering said 3-alkyl-1,2,4-benzothiadiazine-1,1-dioxide.

5. A process for the preparation of 3-alkyl-7-halo-1,2,4-benzothiadiazine-1,1-dioxide which comprises heating 3-(para-halophenyl) - 4-alkyl-1,2,3,5-oxathiadiazole-2-oxide in an inert, anhydrous, organic solvent to a temperature of from about 50° to about 250° C., and thereafter recovering said 3-alkyl-7-halo-1,2,4-benzothiadiazine-1,1-dioxide.

6. A process for the preparation of 3-alkyl-7-alkoxy-1,2,4-benzothiadiazine-1,1-dioxide which comprises heating 3 - (paraalkoxyphenyl) - 4-alkyl-1,2,3,5-oxathiadiazole-2-oxide in an inert, anhydrous, organic solvent to a temperature of from about 50° to about 250° C., and thereafter recovering said 3-alkyl-7-alkoxy-1,2,4-benzothiadiazine-1,1-dioxide.

7. A process for the preparation of 3-methyl-1,2,4-benzothiadiazine-1,1-dioxide which comprises heating 3-phenyl-4-methyl-1,2,3,5-oxathiadiazole-2-oxide in an inert, anhydrous, organic solvent to a temperature of from about 50° to about 250° C., and thereafter recovering said 3-methyl-1,2,4-benzothiadiazine-1,1-dioxide.

8. A process for the preparation of 3-ethyl-1,2,4-benzothiadiazine-1,1-dioxide which comprises heating 3-phenyl-4-ethyl-1,2,3,5-oxathiadiazole-2-oxide in an inert, anhydrous, organic solvent to a temperature of from about 50° to about 250° C., and thereafter recovering said 3-ethyl-1,2,4-benzothiadiazine-1,1-dioxide.

9. A process for the preparation of 3-ethyl-7-chloro-1,2,4-benzothiadiazine-1,1-dioxide which comprises heating 3-(para-chlorophenyl)-4-ethyl-1,2,3,5-oxathiadiazole-2-oxide in an inert, anhydrous, organic solvent to a temperature of from about 50° to about 250° C., and thereafter recovering said 3-ethyl-7-chloro-1,2,4-benzothiadiazine-1,1-dioxide.

10. A process for the preparation of 3-ethyl-7-methoxy-1,2,4-benzothiadiazine-1,1-dioxide which comprises heating 3 - (para-methoxyphenyl) - 4 - ethyl-1,2,3,5-oxathiadiazole-2-oxide in an inert, anhydrous, organic solvent to a temperature of from about 50° to about 250° C., and thereafter recovering said 3-ethyl-7-methoxy-1,2,4-benzothiadiazine-1,1-dioxide.

References Cited by the Applicant
UNITED STATES PATENTS 3,118,902   1/1964   Schmitt.
3,118,903   1/1964   Schmitt.

NICHOLAS S. RIZZO, *Primary Examiner.*